United States Patent [19]

Leiber et al.

[11] Patent Number: 4,948,200
[45] Date of Patent: Aug. 14, 1990

[54] BRAKE PRESSURE SETTING DEVICE

[75] Inventors: Heinz Leiber, Oberriexingen; Manfred Steiner, Stuttgart, both of Fed. Rep. of Germany

[73] Assignee: Daimler-Benz Aktiengesellschaft, Stuttgart, Fed. Rep. of Germany

[21] Appl. No.: 339,110

[22] Filed: Apr. 17, 1989

[30] Foreign Application Priority Data

Apr. 16, 1988 [DE] Fed. Rep. of Germany ....... 3812830

[51] Int. Cl.⁵ .......................... B60T 8/32; B60T 8/40; B60T 13/10; G05D 13/00
[52] U.S. Cl. .................................. 303/115; 303/100; 303/110; 303/116; 303/119
[58] Field of Search ................... 303/96, 98, 100, 110, 303/111, 113, 115, 116, 119; 180/197; 364/426.03

[56] References Cited

U.S. PATENT DOCUMENTS

| | | | |
|---|---|---|---|
| 3,480,335 | 11/1969 | Inada | 303/115 |
| 3,807,810 | 4/1974 | Yarber | 303/119 |
| 3,981,545 | 9/1976 | Eddy | 303/98 |
| 4,175,794 | 11/1979 | Pauwels | 303/119 X |
| 4,726,549 | 2/1988 | Dittner et al. | 303/115 |
| 4,807,943 | 2/1989 | Ogino | 303/113 |
| 4,835,695 | 5/1989 | Walenty et al. | 303/100 X |
| 4,836,617 | 6/1989 | Resch | 180/197 X |

FOREIGN PATENT DOCUMENTS

| | | |
|---|---|---|
| 3531157 | 3/1987 | Fed. Rep. of Germany . |
| 3706661 | 9/1988 | Fed. Rep. of Germany . |
| 0244650 | 10/1986 | Japan ................................ 303/115 |
| 2207206 | 1/1989 | United Kingdom ................ 303/115 |

*Primary Examiner*—Douglas C. Butler
*Attorney, Agent, or Firm*—Evenson, Wands, Edwards, Lenahan & McKeown

[57] ABSTRACT

A brake pressure setting device suitable for both an antilocking control system and drive slip control system is provided and uses a pressure modulator designed as a stepped cylinder defining a modulation chamber which can be connected to the main brake pipe of the brake circuit of the driven vehicle wheels and a control pressure space separated from the modulation chamber by a modulator piston. The control pressure space anc be connected to a pressure outlet of an auxiliary pressure source of alternatively to its non-pressurized sump tank for driving the pistion. A return spring biases the piston into a position associated with maximum volume of the modulation chamber. Connecting the control pressure space to the pressure outlet of the auxiliary pressure source moves the modulator piston into an end position provided for normal brake operation and suitable as an initial position for antilocking control system operation. If a spin tendency appears on a driven viehicle wheel, the modulator piston is brought, as a preparatory measure, into an end position associated with maximum volume of the modulation chamber, so that brake fluid flows from the brake unit into the modulation chamber. In order to activate the drive slip control system, the modulation chamber is shut off from the brake unit and the control pressure space is connected to the high pressure outlet of the auxiliary pressure source. The selection of the wheel to be sujected to the control is made by the brake pressure control valves provided for the antilocking control system.

20 Claims, 1 Drawing Sheet

BRAKE PRESSURE SETTING DEVICE

BACKGROUND AND SUMMARY OF THE INVENTION

The invention concerns a brake pressure setting system for vehicle brakes including, for example, an antilocking system for stabilizing the dynamic behavior of a road vehicle by action upon its brake installation during brake pressure build-up, brake pressure retention and brake pressure reduction phases and wherein the wheel brakes of two driven vehicle wheels are combined in a static brake circuit and are connected via a pressure modulator and an electrically drivable inlet valve to an outlet pressure space of a main brake unit. The pressure modulator is designed as a stepped cylinder with two bore steps of different diameters and in which a stepped piston, with two flanges of correspondingly different diameters, is guided so that it can be displaced in a pressure-tight manner. These flanges of the stepped piston form axially movable boundaries of a modulation chamber and a control pressure space. The modulation chamber is bounded by the smaller diameter piston step and is connected via a pressure inlet control valve, in its basic position, to the outlet pressure space of the main brake unit as well as being permanently connected to a section of a main brake pipe of the static brake circuit which branches off to the wheel brakes. The pressure modulator is provided with a return spring which urges the modulator piston into its basic position that is associated with a maximum volume of the modulation chamber. The control pressure space, bounded by the larger piston step, can be alternatively connected, by an electrically drivable function control valve, to either a pressure outlet of a non-pressurized container of an auxiliary pressure source to displace the stepped piston in a first direction, or to a non-pressurized sump connection of said auxiliary pressure source. Connection to said pressure outlet displaces the stepped piston because of the pressure present in the control pressure space acting against the force of a return spring and the pressure in the modulation chamber, to its end position corresponding to a minimum volume of the modulation chamber and a maximum volume of the control pressure space. Electrically controllable brake pressure control valves are individually provided for each wheel brake and can be driven individually, or jointly, from a basic position, opening a connection between the particular wheel brake and the main brake pipe to permit brake pressure build-up and pressure reduction phases, into an alternative shut off position which is associated with the brake pressure retention phases. An electronic control unit is provided for generating signals required by the control system, for triggering the brake pressure control valves, the function control valve and the inlet control valve by processing output signals, characteristic of the motion behavior of the vehicle wheels from wheel rotational speed sensors.

Such a brake pressure setting device is, in association with an antilocking system for a road vehicle, the subject matter of the Applicants'own, older, German Patent Application No. P 37 23 875.2-21 which corresponds to U.S. patent application Ser. No. 07/220,168, filed July 18, 1988.

The antilocking system described in that application is intended for a road vehicle with front axle/rear axle brake circuit subdivision and real axle drive. The static brake circuit associated with the driven real wheels is connected to an outlet pressure space of a brake unit, designed as a tandem main cylinder of conventional construction, via a pressure modulator and an inlet valve which can be triggered electrically. The pressure modulator is designed as a stepped cylinder with two bores steps of different diameters, mutually offset by a housing step. A stepped piston with two flanges of correspondingly different diameters is guided in the stepped bores so that it is displaceable therein in pressure-tight manner. The two flanges forming axially movable boundaries of a modulation chamber and a control pressure space respectively. Fixed boundaries of the chamber and pressure space are each formed by an end wall of the stepped cylinder housing. In this connection, the modulation chamber is bounded by the smaller diameter piston step and is permanently connected to an initial section of the main brake pipe of the rear axle brake circuit which branches off towards the wheel brakes. In addition, the modulation chamber is connected by the inlet valve, in its basic position, to the brake unit secondary outlet pressure space associated with the rear axle brake circuit. The modulator piston is urged by a powerful return spring into the basic position associated with minimum volume of the modulation chamber. The control pressure space, bounded by the larger piston step, can be alternatively connected through an electrically drivable function control valve to a pressure outlet, or a non-pressurized tank, of an auxiliary pressure source. The stepped piston is then displaceable by outlet pressure of the auxiliary pressure source in the control space acting against the force of the return spring and the pressure present in the modulation chamber, to its end position corresponding to a minimum volume of the modulation chamber and a maximum volume of the control pressure space.

Individually electrically controllable brake pressure control valves are associated with the wheel brakes and these valves can be driven, individually or jointly, from a basic position opening the connection between the particular wheel brake(s) and the main brake pipe of the rear axle brake circuit to permit brake pressure build-up and brake pressure reduction phases, into an alternative shut off position, by which brake pressure retention phases can be achieved. An electronic control unit is provided which generates signals, required by the control system, for triggering the brake pressure control valves, the function control valve and the inlet valve by processing output signals, characteristic of the motion behavior of the vehicle wheels through wheel rotational speed sensors individually associated with the vehicle wheels.

In the antilocking system described in said German Patent Application No. P 37 23 875.2-21, the modulation chamber of the pressure modulator forms a variable volume section of the main brake pipe which, during "normal" braking operation (i.e. one not subject to an antilocking control system) is kept at the minimum value of its volume and, in the case of a braking operation subject to the control system, can be extended so that brake fluid can flow back into the modulation chamber from one of the wheel brakes subject to the control system. This provides for a reduction in brake pressure necessary for the antilocking control system at the wheel brake subject to the control system. Brake pressure restoration phases are controlled by the modulator piston being displaced in the direction of its position corresponding to a minimum volume of the modulation chamber.

Said German Patent Application No. P 37 23 875.2-21 does not reveal any sort of measures by which the brake pressure setting device described therein could also be used for a drive slip control system operating on the principle of retarding a vehicle wheel tending to spin by activating its wheel brake to such an extent that a stable dynamic behavior of the vehicle is achieved even during acceleration operation.

Such a drive slip control system could, however, be effected by providing a second pressure modulator for the brake circuit of the driven vehicle wheels. By this second pressure modulator, used for connecting the outlet pressure of an auxiliary pressure source to a control pressure space of this pressure modulator and shutting off its outlet pressure space from the main brake cylinder, brake pressure could be built up in a wheel brake of a vehicle wheel which shows a tendency to spin and which can be "selected" by the brake pressure control valve of the antilocking system.

Achieving a drive slip control system combined with an antilocking system in such a way would, however, be associated with substantial additional technical expenditure because, as well as the additional pressure modulator, further valves and triggering controls would be necessary.

The same applies in an analogous manner, to the combination of an antilocking system and a drive slip control system described in German Offenlegungsschrift DE No. 3,706,661 A1. In this combination, each of the vehicle wheels subject to an antilocking control system has its own pressure modulator. For each functional control, a functional control valve designed as a 3/3-way solenoid valve is provided, as well as a further pressure modulator and a drive slip control valve which are necessary to achieve the drive slip function. This drive slip function occurs through a control valve connecting or shutting off a control pressure space of this pressure modulator to, or from, the outlet of an auxiliary pressure source. The connection of the auxiliary pressure source to a control pressure space of the further pressure modulator, makes it possible to generate a pressure in the outlet pressure space which can be used as the brake pressure for the drive slip control. This pressure can be connected via inlet valves to the pressure modulators which can also be used for antilocking control.

German Patent DE No. 3,531,157 C1 also reveals a vehicle with all wheel drive and having antilocking control and drive slip control and wherein each of the wheel brakes can be used for one of the two types of control. Each wheel brake is associated with its own pressure modulator. In these pressure modulators, the inlet pressure space, which is connected to a pressure outlet of the brake unit, is sealed by the modulator piston against an outlet pressure space by which it is connected to the particular associated wheel brake through one solenoid valve for each wheel brake. For the antilocking control, a first drive pressure space is provided which can be connected by an antilocking control valve to an auxiliary pressure source. The application of pressure to the drive pressure space causes the modulator piston to be displaced, against the pressure generated by the brake unit and connected to the outlet pressure space in the direction of increasing the outlet pressure space connected to the wheel brake. For the antilocking control, a second drive pressure space is provided as part of each of the modulators. It is possible to connect this second drive pressure space to the auxiliary pressure source, or to shut it off therefrom by a drive slip control valve designed as a solenoid valve. Subjection of this second drive pressure space to pressure causes the modulator piston to experience a displacement in the direction of a build-up of brake pressure in its outlet pressure space. This permits activation of the connected wheel brake, as necessary for a drive slip control without actuation of the brake unit. The inlet, outlet and drive pressure spaces, of the pressure modulators of the known antilocking and drive slip systems are located adjacent to one another, within the particular modulator housing, viewed along the central longitudinal axis of the latter. This leads to a very "long" structural shape of the pressure modulators and to a corresponding disadvantage with respect to the installation space required. The mechanical construction of the pressure modulators is complicated on account of the numerous functional spaces, necessitated by the design of both the modulator housing and the modulator piston and is associated with high technical expenditure.

In addition, very high actuation forces are necessary in the case of a failure of the braking force amplifier of the brake installation, because the frictional resistances of numerous pressure modulator piston seals then have to be overcome by the pedal force with which the driver actuates the brake unit (which is all that is still available) before any worthwhile build-up of brake pressure can occur in the wheel brakes.

It is therefore the object of the invention to improve the known No. DEP-37,23,875.2-21 brake pressure setting device in such a way that it can be used for both the antilocking system and a drive slip control system operation and without any noticeable extra technical expenditure.

The invention achieves this object, when spin tendency appears on one of the driven vehicle wheels, by having the electronic control unit generate output signals by which the brake pressure control valves of the driven vehicle wheels are driven into their shut off positions, maintaining pressure at the brakes and the function control valve is driven into its function positions causing pressure relief of the control pressure space of the pressure modulator. This occurs when the lower limiting values $\lambda_{A1}$ and/or $b_{A1}$ of the drive slip $\lambda_A$ and/or the wheel peripheral acceleration $b_A$ are exceeded. These lower limiting values are lower than threshold values ($\lambda_{A2}$ and/or $b_{A2}$) beyond which the use of a drive slip control system becomes necessary. At the latest, when higher response threshold values $\lambda_{A2}$ and/or $b_{A2}$ are reached, the A2 electronic control unit generates a first output signal for switching the pressure inlet control valve into its shut off position; a second output signal which initiates the switching back that one of the brake pressure control valves, associated with the wheel with the tendency to spin, into its basic positions and a third signal which initiates the switching back of the function control valve into its basic position, causing the control pressure space to be connected to the pressure outlet of the auxiliary pressure source. After the spin tendency has decayed, the electronic control unit generates that combination of output signals which causes all of the valves to be switched back into their basic positions.

By this, the electronic control unit is "extended" by a drive slip control function part, which controls the following functions:

When a spin tendency appears on one of the driven vehicle wheels, which is "recognized" by monitoring the drive slip $\lambda_A$ and the wheel peripheral accelerations $b_A$, output signals are generated by the electronic control unit even before relevant response threshold values $\lambda_{AS}$ and/or $b_{AS}$ are reached which, AS if they are exceeded, demand activation of the wheel brake of the vehicle wheel tending to spin, i.e. response from the drive slip control system. By these output signals, the brake pressure control valves of the driven wheels are driven into their shut off position and the function control valve is driven into its functional position causing pressure relief of the control pressure space of the pressure modulator. By this, the modulator piston experiences, due to the effect of its return spring, a displacement in the direction of increasing the volume of the modulation chamber, into which brake fluid can flow from the outlet pressure space of the brake unit via the inlet valve which is still in its basic position. Make-up brake fluid will then flow from the reservoir of the brake installation into the outlet pressure space of the brake unit. As soon as the modulation chamber has accepted a quantity of brake fluid, whose displacement into the brake circuit of the driven vehicle wheels can generate a sufficiently high brake pressure for the braking of these vehicle wheels, the inlet valve connected between the modulation chamber and the outlet pressure space of the brake unit, is switched into its shut off position by an output signal of the electronic control unit.

The brake pressure setting device is now prepared for drive slip control operation whose introductory brake pressure build-up phase on a vehicle wheel tending to spin and/or wheel acceleration of this wheel exceed the response threshold value $\lambda_{AS}$ and/or $b_{AS}$. This occurs by switching the brake pressure control valve of this vehicle wheel back again into its basic through flow position and by also switching the functional control valve back into its basic position, in which the control pressure space of the pressure modulator is again connected to the high pressure outlet of the auxiliary pressure source and, in consequence thereof, the modulator piston experiences a displacement in the direction of reducing the volume of the modulation chamber. Because of this, brake fluid is forced into the wheel brake of the vehicle wheel subject to the control system and brake pressure is built up in this wheel brake to retard this vehicle wheel. A brake pressure retention phase on the vehicle wheel subject to the control system can be controlled by again switching its brake pressure control valve into its shut off position.

In order to control brake pressure reduction phases of the drive slip control system, it is particularly advantageous if when the spin tendency decays, the electronic control unit first generates an output signal by which the function control valve is driven back into its actuated position causing pressure relief of the control pressure space of the pressure modulator so that, initially, brake fluid is again accepted by the modulation chamber of the pressure modulator from the wheel brake of the vehicle wheel subject to the control system and the inlet valve is only subsequently switched back into its basic position connecting the modulation chamber with the outlet pressure space of the brake unit. By this operation the appearance of "pressure shocks" in the brake unit, which can lead to undesirable load on the piston seals forming the boundaries of the outlet pressure space, can be substantially reduce.

In any event, all the valves are switched back into their basic position, after the decay of the spin tendency, in order to terminate the drive slip control.

The preparation of the brake pressure setting device for drive slip control operation by having the electronic control unit generate a signal causing the switching of the function control valve into its position connecting the control pressure space of the pressure modulator to the high pressure outlet of the auxiliary pressure source immediately after the pressure inlet control valve is switched into its shut off position, has the advantage that the brake fluid in the modulation chamber and the main brake pipe of the brake circuit of the driven vehicle wheels connected to it, is already under high pressure, when the brake pressure control valve of the wheel brake of the vehicle wheel to be subjected to the control system, for the purpose of brake pressure build-up, is switched back again into its basic position. This provides for a rapid response of the drive slip control.

A preferred arrangement of the brake pressure setting device according to the invention, provides for a displacement indicator which emits electrical output signals characteristic of the position of the piston of the pressure modulator.

By such a displacement indicator, it is, for example, possible to very accurately direct a withdrawal motion of the modulator piston (which causes the brake pressure reduction in a wheel brake) to that position from which (when the pressure build-up phase commences) displacement of the modulator piston takes place in the direction to build-up of brake pressure. This makes it possible to reduce to a minimum, or even to avoid, balance flows between the brake unit and the modulation chamber, which might otherwise occur when the inlet valve is open. This has the object of avoiding pressure shocks in the brake unit. In addition, the output signals of such a displacement indicator can also be used in an advantageous manner for both the drive slip control operation and the antilocking control operation in order to achieve proper control phases to meet the requirements of the apportionment and/or reduction of pressure. Thus an improvement in the control behavior for both types of control is achievable in an obvious manner.

The same applies in an analogous manner to the design of the brake pressure setting device which has a force signal generator integrated in the modulator piston. The electrical output signal of this signal generator is a direct measure of the brake pressure in the wheel brake, subject to the control system, and can therefore also be used for correct brake pressure control to suit the control requirements.

Although the brake pressure setting device is fail-safe to such an extent that, should the electronic control fail, the inlet valve, the brake pressure control valves and the function control valve return to their basic positions in which normal brake operation is possible, it may nevertheless be expedient if, as an additional safety measure, a bypass flow path is provided in parallel to the brake pressure setting device. This includes a bypass pipe directly connected to the outlet pressure space of the brake unit associated with the brake circuit of the driven vehicle wheels. This bypass pipe can be shut off to the outlet pressure space by an outlet control valve. This outlet control valve is connected to each of the vehicle wheel brakes of the driven vehicle by an outlet non-return valve. This outlet control valve is designed as a solenoid valve which can be driven into a through flow and shut off positions co-jointly with the inlet control valve. Thus, should the inlet valve "stick" in its shut off position after an antilocking or drive slip control phase, at least the brake pressure can be reduced again by withdrawal of the brake pedal.

Other objects, advantages and novel features of the present invention will become apparent from the following detailed description of the invention when considered in conjunction with the accompanying drawings.

DETAILED DESCRIPTION OF THE DRAWINGS

Figure 1:
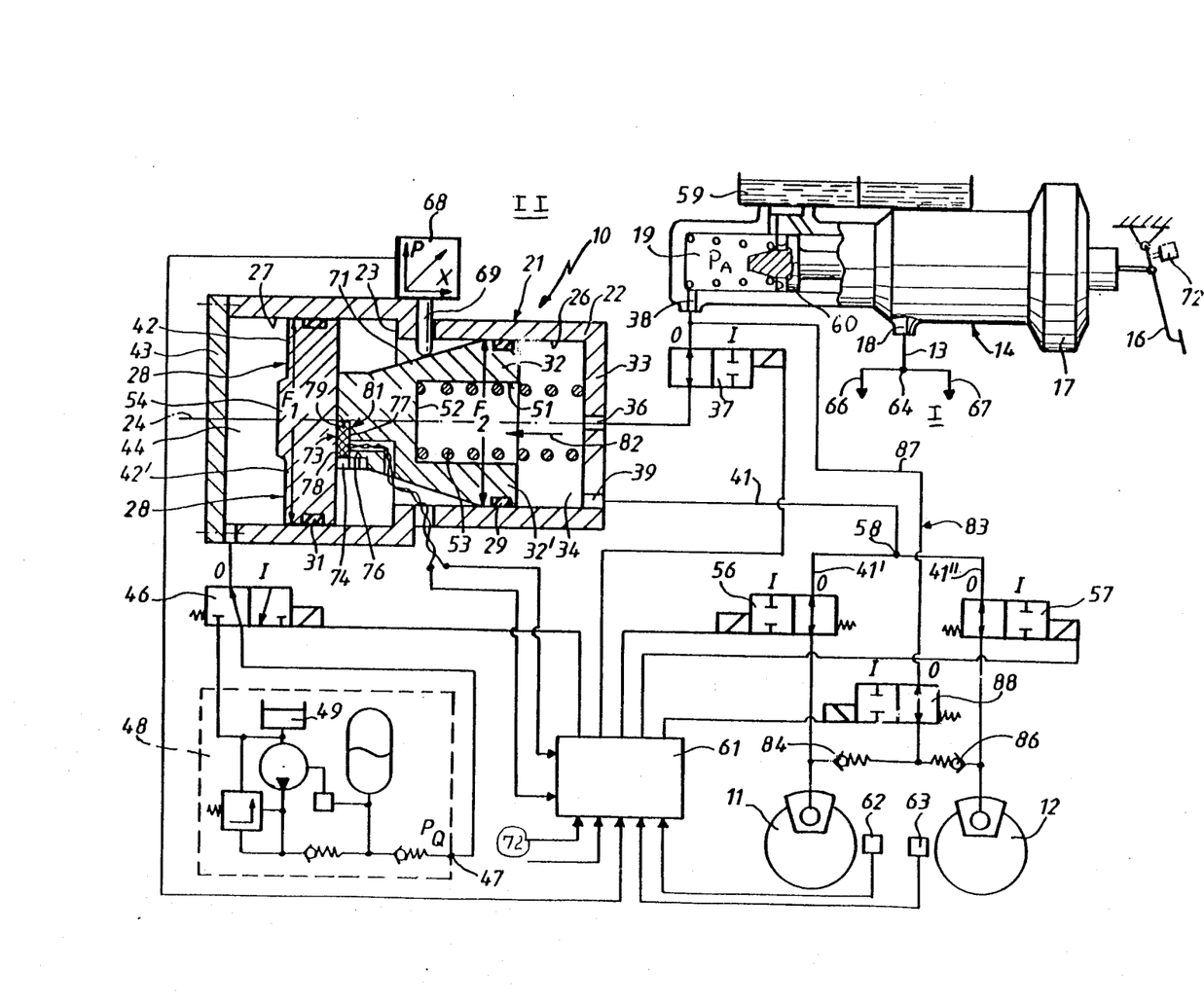
The figure shows a simplified diagrammatic block circuit diagram presentation an antilocking and drive slip control brake pressure setting device according to the invention and which is designed for a road vehicle with front axle/rear axle brake circuit subdivision and rear axle drive.

The drawing shows a hydraulic two circuit brake installation for a road vehicle with a brake pressure setting device 10. The vehicle is equipped with both an antilocking system and a drive slip control system. The brake pressure setting device is provided both for controlling brake pressure reduction, retention and restoration phases of the antilocking system and for control of brake pressure build-up, retention and brake pressure reduction phases of the drive slip control system. For the sake of illustration, it is assumed that the vehicle has a rear axle drive with rear wheel brakes 11 and 12 representing the driven vehicle wheels and being combined in a real axle brake circuit II. The front wheel brakes are not shown for simplicity, but they are combined in a front axle brake circuit I which is only represented in the drawing by the main brake pipe 13 branching off to the front wheel brakes. The two brake circuits I and II are assumed to be static brake circuits having brake pressure supplied from a stepped tandem main cylinder 14 of a conventional type. This tandem main cylinder 14 can be activated by the brake pedal 16 via a brake force amplifier 17, e.g. a vacuum brake force amplifier. The front axle brake circuit I is connected to the pressure outlet 18 of the primary stage of the tandem main cylinder 14 and the real axle brake circuit II is connected to the outlet pressure space 19 of the secondary stage of the tandem main cylinder 14.

The brake pressure setting device 10 provided for the brake pressure control corresponding to the particular control purpose in the real axle brake circuit II includes, as a central functional element, a pressure modulator designed as a stepped cylinder 21 and, having a casing 22 with two bore steps 26 and 27 arranged: adjacent to one another in the longitudinal direction of the modulator housing 22, co-axial with respect to its central longitudinal axis 24, and mutually offset and joining one another by a radial step 23. A corresponding stepped and displaceable modulator piston, is sealed against the bore steps 26 and 27 by ring seals 29 and 31, respectively, fixed relative to the piston.

A functional space of the pressure modulator 21, referred to as the modulation chamber 34, is movably bounded in the axial direction by the smaller diameter piston flange 32 of the modulator piston 28 within the smaller bore step 26 of the modulator housing 22 and has a fixed boundary, relative to the housing, by an end wall 33 of the modulator housing 22 closing the bore step 26 from the outside. Brake pressure reduction and brake pressure build-up phases of the control types to be considered, can be controlled by changes in volume of this modulation chamber 34.

This modulation chamber 34 has a pressure inlet 36 which is connected to the secondary pressure outlet 38 of the tandem main cylinder 14, associated with the rear axle brake circuit II via a pressure inlet control valve 37. This inlet control valve 37 is designed as a 2/2-way solenoid valve whose basic "0" position is its through flow position and whose actuated "I" position is its shut off position. The modulation chamber 34 has a pressure outlet 39 to which is connected the main brake pipe 41 of the rear axle brake circuit II. This main brake 15 pipe branches off towards the rear wheel brakes 11 and 12 via lines 41' and 41".

Another functional space of the pressure modulator is referred to as the control pressure space 44 and is bounded in the axial direction by the larger diameter annular flange-shaped piston step 42 of the modulator piston 28 and the end wall 43 of the modulator housing 22 closing the correspondingly larger bore step 27 of the modulator housing 22 towards the outside. The larger piston step 42 is sealed at 31 in such a manner that it can be displaced in the bore step 27. The control pressure space 44 can be connected via a function control valve 46 to a high pressure outlet 47 of a hydraulic auxiliary pressure source 48, to be subject to its outlet pressure and alternatively can be relieved of pressure by connection to a non-pressurized sump container 49 of said auxiliary pressure source 48. The structure of the auxiliary pressure source is well known in antilocking brake systems art and hence the details thereof are omitted from this disclosure.

The function control valve 46 is designed as a 3/2-way solenoid valve in whose basic "0" position, the control pressure space 44 of the pressure modulator 21 is connected to the high pressure outlet 47 of the auxiliary pressure source 48 and is shut off from the sump container 49. In its actuated "I" position, the control pressure space 44 of the pressure modulator 21 is connected to the sump container 49 of the auxiliary pressure source 48 and is shut off from its pressure outlet 47.

On the smaller piston step 32 of the modulator piston 28 there is a central blind hole 51 that opens towards the modulation chamber 34 and which has an axial depth corresponding approximately to the length of this smaller piston step 32.

A powerful return spring 53 is axially supported between the bottom 52 of this blind hole 51 of the modulator piston 28, and the end wall 33 closing the smaller bore step 26 of the modulator housing 22 towards the outside. This return spring 53 attempts to force the modulator piston 28 into its left end position associated with a maximum volume of the modulation chamber 34 and a minimum volume of the control pressure space 44. In this left end position, the modulator piston 28 is supported by a central stop protrusion 54, only slightly extended in the axial direction, against the end wall 43 of the modulator housing 22 closing the larger bore step 27 from the outside.

The other end position of the modulator piston 28, which is associated with minimum volume of the modulation chamber 34 and maximum volume of the control pressure space 44 of the pressure modulator 21, is obtained by contact between the larger piston step 42 and the radial housing step 23.

The brake pressure control valves 56 and 57 are provided in the brake pipe branches 41' and 41", respectively. The control brake pressure fluid flow starting from the branch position 58 of the main brake pipe 41 of the real axle brake circuit II and leading to the wheel brakes 11 and 12, can be shut off singly or at times, jointly from the pressure outlet 39 of the modulation chamber 34 of the pressure modulator 24. These control valves 56 and 57 are designed as 2/2-way solenoid valves, each of whose basic "0" positions are the through flow positions and whose actuated "I" positions are the shut off positions.

Before dealing below with further constructional details of pressure modulator 21 and its function, consideration is first given to how brake pressure change and brake pressure generation phases necessary for both antilocking control and for drive slip control can be achieved using the functional components of the brake pressure setting device 10 at the wheel brakes 11 and 12 of the driven vehicle wheels as so far explained. It is assumed that the antilocking control and the drive slip control each take place in accordance with generally known criteria and that therefore it is not necessary to explain them in this application.

In order to explain the typical antilocking and drive slip control cycles which can be controlled by the brake pressure setting device 10, the antilocking control operation is considered first.

As long as the antilocking control system has not responded to an actual or impending locking situation, the pressure inlet control valve 37, the function control valve 46 and the brake pressure control valves 56 and 57 each are in their basic "0" positions. The piston 28 of the pressure modulator 21 is subjected on its cross-sectional area $F_1$, corresponding to the cross-sectional area of the larger bore step 27 of its housing 22, to the high outlet pressure $P_Q$ of the auxiliary pressure source 48, which is connected to the control pressure space 44 of the pressure modulator 21 via the function control valve 46 which is in its basic "0" position. On area $F_2$ of the smaller piston step 32, corresponding to the cross-sectional area of the smaller bore step 26 of the modulator housing 22, the modulator piston 28 is subjected, when the brake installation is actuated, to the brake pressure $P_A$ generated by the brake unit 14 and connected to the modulation chamber 34 via the pressure inlet control valve 37, which is in its basic "0" position. The brake pressure is also connected to the wheel brakes 11 and 12 of the driven rear wheels of the vehicle via the main brake pipe 41 of the rear axle brake circuit II, which is connected to the pressure outlet 39 of the modulation chamber 34 and the wheel brake pipe branches 41' and 41" through brake pressure control valves 56 and 57 which are in their basic "0" position.

The ratio $F_1/F_2$ of the effective areas $F_1$ and $F_2$ of the larger piston step 42 and the smaller piston step 32 of the modulator piston 28 is selected to be sufficiently large, so that even if the maximum brake pressure $P_A$ which can be achieved by actuating the brake unit 44, is connected to the modulation chamber 34, the modulator piston 28 is still urged toward its right end position, associated with minimum volume of the modulation chamber 34. The larger piston step 42 is subject to the outlet pressure $P_Q$ of the auxiliary pressure source 48 in pressure space 44 and against the return force of the return spring 53 and the pressure in modulation chamber 34 and is held in the intermediate position shown in the drawing as long as the control pressure space 44 is connected to the pressure outlet 47 of the auxiliary pressure source 48.

It should be noted that the modulator piston 28, notwithstanding the representation of the solenoid valves 37, 46, 56 and 57 in their basic "0" positions, is not in the end position corresponding to the minimum volume of the modulation chamber 34, but is in an intermediate position (as shown) to which reference will be made later in order to explain a control cycle of the drive slip control system.

If a locking tendency occurs during a braking operation, e.g. on the left-hand rear wheel represented by the wheel brake 11, an introductory brake pressure reduction phase of an antilocking control cycle necessary for this situation is controlled as follows:

The pressure inlet control valve 37 connected between the pressure outlet 38 and the pressure inlet 36 of the modulation chamber 34 of the pressure modulator 21 is driven into its actuated "I" shut off position and thus no further build up of brake pressure in the rear axle brake circuit II is possible, even if the driver continues to actuate the brake pedal 16 with increasing foot force.

Switching the pressure inlet control valve 37 into its shut off "I" position also initiates the switching of the brake pressure control valve 57, associated with the wheel brake 12 of the right-hand real wheel, into is shut off "I" position. This has the effect that wheel brake 12 of the right-hand rear wheel, which can still transmit braking force, has its brake pressure retained at the valve selected before activation of the antilocking control system.

Furthermore, switching the pressure inlet control valve 37 into its shut off "I" position also initiates the switching of the function control valve 46 into its actuated "I" position in which the control pressure space 44 of the pressure modulator 21 is now connected to the non-pressurized sump container 49 of the auxiliary pressure source 48 and can be relieved into this tank. The brake pressure control valve 56 associated with the left-hand rear wheel brake 11 and in which the brake pressure has to be reduced, remains in its basic "0" through flow position.

The pressure reduction occurs because the modulator piston 28 experiences a displacement in the direction of increasing the volume of the modulation chamber 34 due to the return spring 53 and the pressure present in the modulation chamber 34 and because the pressure in the control pressure space 44 has now been relieved. The brake fluid can flow via open valve 56, brake branch line 41' and the main brake pipe 41 of the rear axle brake circuit II into the modulation chamber 34 and as consequence thereof, a brake pressure reduction is achieved in the left-hand rear wheel brake 11.

Pressure reduction phases can also be controlled in an analogous manner on the right-hand rear wheel brake 12 and, if necessary, on both rear wheel brakes 11 and 12.

If, after a brake pressure reduction phase as described so far, the brake pressure on the wheel brake 11 has to be maintained at the lowered value achieved up to this point by the control system, the brake pressure control valve 56 associated with the left-handed rear wheel brake 11 is also driven into its shut off "I" position while the pressure inlet control valve 37 continues to be held in its shut off "I" position and while the function control valve 46 is now switched back into its basic "0" position, wherein the outlet pressure $P_Q$ of the auxiliary pressure source 48 is again connected to the control pressure space 44 of the pressure modulator 21. Right-hand load displacement of the modulator piston 28 in the direction of reducing the volume of its modulation chamber 34 does not occur, because the modulation chamber 34 remains, initially shut off from both the pressure outlet 38 of the tandem main cylinder 14 and from the wheel brakes 11 and 12.

For a subsequently necessary brake pressure restoration phase on one or both rear wheel brake(s) 11 and/or 12, the brake pressure control valve(s) 56 and/or 57 of the particular rear wheel brake(s) 11 and/or 12 is switched back into its basic "0" position while the pressure inlet control valve 37 connected between the pressure modulator 21 and the brake unit 14 continues to be kept in its shut off "I" position.

Because the outlet pressure $P_Q$ of the auxiliary pressure source 48 is now again connected to the control pressure space 44 of the pressure modulator 21, the modulator piston 28 now experiences a displacement toward the right in the direction of reducing the volume of its modulation chamber 34. By this means, brake fluid which had previously been accepted by the modulation chamber 34 from the wheel brake(s) 11 and/or 12 subject to the control system so as to initially reduce the brake pressure, is now forced back again into the wheel brake(s) 11 and/or 12 to restore brake pressure thereat.

If, after a brake pressure restoration phase of the antilocking control system controlled in the manner described above, there is no longer any locking tendency on the rear axle of the vehicle, the pressure inlet control valve 37, connected between the brake unit 14 and the pressure modulator 21 is also switched back into its basic "0" position so that the outlet pressure $P_A$ of the tandem main cylinder 14 is now again available for a further build-up of brake pressure.

If, on the other hand, a spin tendency appears on one of the driven vehicle wheels (the left-hand rear wheel of the vehicle for example) which is to be combated in order to ensure the dynamic stability of the vehicle, an action on the brake system suitable for this purpose can be controlled as follows:

If a spin tendency, which is initially still "weak", appears on one of the driven vehicle wheels, e.g. the left-hand rear wheel, such that the drive slip $\lambda_A$ of the rear wheel considered exceeds a first threshold value $\lambda_{A1}$ which is, however, still within the range of values compatible with good driving stability (this range of values being limited by an upper boundary $\lambda_{A2}$ beyond which activation of the drive slip control is necessary) and/or a threshold value $b_{A1}$ of the wheel peripheral acceleration being exceeded, which again is still within the range of acceleration values compatible with good driving stability (this range of values being again limited by an upper boundary $b_{A2}$ beyond which activation of the drive slip control becomes necessary, these threshold values $\lambda_{A1}$ and $b_{A1}$ differing only relatively "slightly" from the particular upper boundaries $\lambda_{A2}$ and $b_{A2}$, e.g. by 20–30% of the magnitude of these boundaries from the upper limiting values $\lambda_{A2}$ and $b_{A2}$), the brake pressure setting device 10 is then prepared for drive slip control operation. This is done by switching the two brake pressure control valves 56 and 57 into their shut off "I" positions and also switching the function control value 46 into is actuated "I" position. The rear wheel brakes 11 and 12 are therefore shut off from the modulation chamber 34 of the pressure modulator 21 which, however, is connected via the still open pressure inlet control valve 37 to the secondary outlet pressure space 19 of the tandem main cylinder 14 and therefore also to its brake fluid reservoir 59. The control pressure space 44 is now relieved to the sump tank 49 of the auxiliary pressure source 48, since the function control valve 46 is in its active "I" position, and with the result that the modulator piston 28 due to the action of the return spring 53 experiences a displacement in the direction of increasing the volume of the modulation chamber 34. A quality of brake fluid corresponding to the increase in volume of modulation chambers 34 flows via the pressure inlet control valve 37, which is in its basic "0" position, from the secondary outlet pressure space 19 of the tandem main cylinder 14 into the modulation chamber 34 of the pressure modulator 21 and with a corresponding quality of brake fluid flow from the brake fluid reservoir 59 into the secondary outlet pressure space 19 of the tandem main cylinder 14. This is possible in the basic position of the floating piston 60 of the tandem main cylinder 14 which forms the movable boundary of the secondary outlet pressure space 19. This basic position corresponds to the non-actuated condition of the brake installation. By this operation, the modulator piston reaches its left end position which is associated with maximum volume of the modulation chamber 34.

The pressure inlet control valve 37 is then switched, as a preparatory measure, into its shut off "I" position. If the spin tendency of the left hand rear wheel increases further in such a way that at least one of the two upper limiting values $\lambda_{A2}$ and $b_{A2}$ of the drive slip or of the wheel peripheral acceleration of the vehicle wheel considered is exceeded, the function control valve 46 and the brake pressure control valve 56 of the wheel brake 11 of the vehicle wheel tending to spin are again switched into their basic "0" positions so that the control pressure space 44 is again subject to the high outlet pressure $P_Q$ of the auxiliary pressure source 48 to displace the modulator piston 21 a in the direction of reducing the volume of its modulation chamber 34. Thus, brake fluid is forced from the modulation chamber 34 into the wheel brake cylinder of the wheel brake 11 of the vehicle wheel tending to spin, which vehicle wheel is thus braked.

Thus, as soon as a reduction in the spin tendency occurs, (initially only in the sense that the drive slip $\lambda_A$, no longer increases and, in consequence, the magnitude of the wheel peripheral acceleration $b_A$ has become 0), the brake pressure control valve 56 is again switched into its shut off "I" position which causes the brake pressure in the wheel brake 11 of the rear wheel, possibly still subject to excessive drive slip $\lambda_A$, to be held at the value to which it has been controlled up until then.

If the spin tendency of the vehicle wheel considered does not decay further (which can, for example, be recognized from a renewed increase in the wheel peripheral acceleration $b_A$ and/or of the drive slip $\lambda_A$), brake pressure control valve 56 is again switched back into its basic "0" through flow position and the brake pressure in the wheel brake 11 is further increased.

If, after a subsequent second brake pressure retention phase, which can be controlled in a manner analogous to the above first brake pressure retention phase (or even after the earlier phase), the spin tendency of the vehicle wheel considered decays, (which is recognizable from the fact that the drive slip $\lambda_A$ and the wheel peripheral acceleration $b_A$ of the previously spinning vehicle wheel are again within the range of values of these parameters compatible with good driving stability), the drive slip control is ended by switching the brake pressure control valves 56 and 57 of the rear axle brake circuit II and also the brake inlet control valve 37 back into their respective basic "0" positions which causes the brake pressure, connected to the wheel brake 11 of the vehicle wheel previously tending to spin, to again be reduced. Here the brake fluid quantity previously accepted by the modulation chamber 34 of the pressure modulator 21 is also forced back into the outlet pressure space 19 of the tandem main cylinder 14 and into its brake fluid reservoir 59.

During this procedure, it is desirable that the brake pressure control valve 57 of the wheel brake 12 of the right-hand rear wheel of the vehicle, not previously tending to spin, be switched back into its basic "0" position only after the brake pressure in the wheel brake 11 of the rear wheel previously tending to spin has been completely reduced.

The brake pressure reduction phase concluding a control cycle of the drive slip control can also be controlled in such a manner that while the pressure inlet control valve 37 is initially still held in its shut off "I" position, the function control valve 46 is switched back to its actuated "I" position. This causes a leftward displacement of the modulator piston 28 in the direction of increasing the volume of its modulation chamber 34 and is first initiated in such a way that the quantity of brake fluid, previously displaced into the main brake pipe 41 of the rear axle brake circuit II and into the wheel brake 11 of the vehicle wheel subject to the control system, is initially reaccepted quantitatively by the modulation chamber 34. This leads to a complete brake pressure reduction in the wheel brake 11 used for the control. After this, the brake pressure control valve 56 is switched back into its shut off "I" position and the brake pressure control valve 57 of the other rear wheel brake 12 is maintained in its shut off "I" position. The pressure inlet control valve 37 is then switched back into its through flow "0" position whereupon the function control valve 46 is switched back into its basic "0" position. This causes rightward displacement of the modulator piston 28 to pump the brake fluid previously accepted in the modulation chamber 34 back into the outlet pressure space 19 and the reservoir 59 of the tandem main cylinder 14.

The control signals necessary for triggering the pressure inlet control valve 37, the function control valve 46 and the brake control pressure control valves 56 and 57, as required by both the antilocking control system and the drive slip control system are generated by the electronic antilocking control and drive slip control unit 61 according to known criteria which essentially is a process of comparing and differentiating the electrical output signals from wheel rotational speed sensors 62 and 63, which are provided for monitoring the motion behavior of the vehicle wheels. Such wheel rotational speed sensors are provided not only for the driven rear wheels of the vehicle, as shown in the drawing, but also for its non-driven front wheels.

Various control phases are possible on the two rear wheel brakes 11 and 12 with the brake pressure setting device 10 shown. This is possible since the brake pressure can be increased or lowered on one wheel brake 11 or 12 while it is kept constant on the other rear wheel brake 12 or 11. By these feedback and open chain control possibilities, which are provided with a favorably simple overall construction of the brake pressure setting device 10, a control behavior fully adequate with respect to both antilocking control and drive slip control for the rear axle of the vehicle is achieved. With respect to antilocking control, this control behavior is in fact, more sensitive than, for example, that of an antilocking control operating on the select low principle and, with respect to the drive slip control, it fulfills to an adequate extent the requirements of a single wheel control, because it is always possible to have the brake control applied to the wheel which first tends to spin.

A "counter phrase" brake pressure change on the two rear wheel brakes 11 and 12, in the sense that the brake pressure is increased on one wheel brake 11 or 12 and is simultaneously decreased on the other wheel brake 12 or 11, is not possible with the brake pressure setting device shown.

A counter phrase brake pressure control in this sense (which in terms of antilocking control is important on the front axle rather than the rear axle) can of course be achieved. Assuming an analogous design of brake pressure setting devices provided for the front wheel brakes by a pressure modulator corresponding in construction to the pressure modulator 21, a pressure inlet control valve and an antilocking functional control valve 46 are provided for each of the front axle brake circuit branches 66 and 67, emerging from the branch position 64 of the front axle brake circuit I. It is also possible to use a single auxiliary pressure source 48 for both the rear and the front brake pressure setting devices.

The design of the brake pressure setting device 10 necessary for the possibility of "counter phrase" control of the brake pressure on the front wheel brakes and/or the rear wheel brakes 11 and 12 should a counter phrase control be desired and the corresponding design of the electronic control unit 61 are well within the understanding of one skilled in the control unit when given knowledge of the control objective. Accordingly in order to shorten this disclosure, the details of such a control unit 61 are not presented here since in this respect they appear unnecessary.

The pressure modulator 21 of the brake pressure setting device 10 explained up to this point with respect to its functional construction and the consequently possible control functions, is equipped (the particular configuration shown) with a displacement and position indicator 68 which generates an electrical output signal varying continually with deflections of the modulator piston 28 and characteristic of the piston's 28 current position. This output signal is supplied as additional information input to the electrical antilocking and drive slip control unit 61.

This displacement indicator 68 can be of a known design and construction, e.g., a resistance signal generator or an inductive signal generator which responds to radial deflections of an actuation pin 69 associated with the axial displacements of the piston 28. The free end of the actuation pin 69 has sliding support on a conical outside surface 71 of the modulator piston 28. This surface extend between the small piston flange 32 and the larger piston flange 42 of the modulator piston 28. As may be seen from the drawing, the surface becomes narrower towards the larger piston step 42. Here, the axial extent and arrangement of this conical outer surface 71 of the modulator piston 28 is arranged in such a way that the output signal of the displacement position indicator 68 is correlated in an unambiguous manner with the piston position in each of the intermediate positions possible between the two end positions of the piston 28. The position indicator 68 is so designed that its output signal varies in proportion to changes in the piston position.

In particular design of the brake pressure setting device 10 and its electronic control unit 61, the modulator piston 28 is brought from its basic position corresponding to minimum volume of the modulation chamber 34 into the intermediate position shown in the drawing whenever, during acceleration operation of the vehicle, the "sensitization" threshold valves (sic)$^\lambda A_1$ and/or $b_A$ set for the recognition of an imminent spin tendency are exceeded. This intermediate position corresponds, for example, to half the value of the maximum volume of the modulation chamber 34 and also corresponds to half the value of the maximum volume of the control pressure space 44. Occupation of the central position of the piston 28 ca be controlled by the function control valve 46 being switched into its actuated "I" position, associated with pressure relief of the drive pressure space 44, while the pressure inlet control valve 37 takes up its basic "0" position, until the output signal of the position indicator 68 shows that the piston 28 has passed slightly "to the other side" of the central position (i.e. has reached a position corresponding to a volume somewhat larger than half the value of the maximum volume of the modulation chamber 34) and then the function control valve 46 is switched back, in a pulsating manner if necessary, into its basic "0" position or is switched between its actuated "I" position and the basic "0" position until the output signal of the position indicator 68 shows that the piston 28 has reached its desired intermediate position. Then the pressure inlet control valve 37 is switched into its actuated "I" shut off position and the function control valve 46 is initially held in its basic "0" position for connecting the control pressure space 44 with the pressure outlet 47 of the auxiliary pressure source 48. During this setting procedure, the brake pressure control valves 56 and 57 are, switched into their shut off "I" positions as already explained above. They are held there until a drive slip control phase is initiated or the vehicle is retarded by actuation of the brake installation.

The brake pressure setting device 10 is now prepared for both drive slip control operation and antilocking control operation, because it is possible to displace the modulator piston 28 from its intermediate position, which has been assumed as a preparatory measure, in the direction of either a volume reduction or a volume increase of the modulation chamber 34 of the pressure modulator 21.

If in a vehicle acceleration phase, a spin tendency occurs on one of the driven vehicle wheels, the measures taken to combat it can be controlled as already explained above, although in the explanation example selected, a volume of brake fluid corresponding to only half the maximum volume of the modulation chamber 34 is initially available for the brake pressure buildup in the wheel brake(s) 11 and/or 12. If the quantity of brake fluid displaceable into the brake circuit II by one brake pressure buildup stroke of the modulator piston 28 is not sufficient for a buildup of brake pressure sufficient to combat the spin tendency in the wheel brake activated for control purposes (e.g. the left-handed rear wheel brake 11), the brake pressure control valve 56 of the rear wheel brake 11 subject to the control system, is also switched back into is shut off "I" position while the brake pressure control valve 57 of the right-hand rear wheel brake 12 continues to be held in its shut off "I" position. The function control valve 46 is then switched into its actuated "I" position and the pressure inlet control valve 37 is switched back into is "0" position so that brake fluid can again flow into the modulation chamber 34, whose volume is increasing. This brake fluid can be used in a subsequent brake pressure buildup phase for a further buildup of brake pressure in the wheel brake 11 subject to the control system. This brake pressure buildup phase being controllable in a manner analogous to that already described above (i.e. by renewed switching of the function control valve 46 into its basic "0" position and by switching the pressure inlet control valve 37 into its actuated I shut off position and switching back the brake pressure control valve 56 of the wheel brake 11 into its basic "0" position).

The output signal of the position indicator 68 can then be used for control purposes to meet the requirements of the displacement motions of the modulator piston 28 necessary for a further supply of brake fluid into the brake circuit II of the driven vehicle wheels. This occurs by the modulator piston 28 experiencing a leftward displacement in the direction of increasing the modulation chamber 34 of the pressure modulator 21 only to the extent necessary to accept that volume of brake fluid which is still required to build up the "residual" brake pressure necessary to combat the spin tendency.

Information on the position of the modulator piston 28 provided by the position indicator 68 therefore makes it possible to minimize the displacement periods which are necessary to suit the requirements of the modulator piston 28 and hence to minimize the control cycle times overall. Thus control sensitivity is improved.

If brake pressure setting device 10 was prepared for a drive slip control operation (and it therefore has to be assumed that the vehicle is in motion on a track with "poor" friction coefficients between the track and the vehicle wheels) and there is a need for braking, since braking must take priority over drive slip control, the pressure inlet control valve 37 and the brake pressure control valves 56 and 57 of the rear wheel brakes 11 and 12 are switched back into their basic "0" positions so that brake pressure can be built up in these rear wheel brakes 11, 12. This switching operation preferably does not take place until the outlet pressure space 19 of the tandem main cylinder 14 is shut off from the brake fluid reservoir 59, after an introductory displacement of the main cylinder piston 60, in order to prevent brake fluid from flowing back from the pressure modulation chamber 34 via the now open pressure inlet control valve 37 into the outlet pressure space 19 of the tandem main cylinder 14 and from there into the brake fluid reservoir 59.

An advantageous control possibility can also consist in the fact that when the brake installation is actuated, an output signal of the brake light switch 72 is supplied as a further information input to the electronic control unit 61. The brake pressure control valves 56 and 57 are first switched back into their basic "0" positions before the pressure inlet control valve 37 is switched back into its basic "0" position, in order to build up brake pressure in the rear wheel brakes 11 and 12 by the pressure modulator 21 "in advance" and before the pressure inlet control valve 37 is switched into its basic "0" position. A braking action necessary in this situation will therefore be supported (in an obvious manner) by the brake pressure setting device 10 as now prepared for the drive slip control operation.

If a locking tendency appears on one of the rear wheels during the course of this braking operation, which will be the case with a relatively high degree of probability given the assumed initial situation, the brake pressure setting device 10 is also adequately prepared for necessary antilocking control operation. This is true because even it the antilocking control operation starts immediately, i.e. while the piston 28 is practically still in the central position shown, there is still sufficient displacement path available for an increase in volume of the modulation chamber 34. If, the antilocking control is only initiated "later", i.e. after a quantity of brake fluid, greater than the increase in volume of the modulation chamber 34, has been displaced into the wheel brakes 11 and 12 by a single return stroke of the modulator piston 28, and if the antilocking control demands a very substantial reduction in brake pressure, which cannot be provided by a single modulation stroke of the piston 28 leading to the end position associated with the maximum volume of the modulation chamber, the brake pressure setting device is then switched to "pump back operation." For this purpose, the two brake pressure control valves 56 and 57 of the rear axle brake circuit II are switched into their shut off "I" positions and both the function control valve 46 and the pressure inlet control valve 37 are switched back into their basic "0" positions. By this operation a pump back stroke of the modulator piston 28 is initiated by which, brake fluid previously accepted by the modulation chamber 34 in pressure reduction operation, is then pumped back into the secondary output pressure space 19 of the brake unit 14. Here again, the output signal of the position indicator 68 is used for stroke control of the modulator piston 28 in such a way that its pressure reduction and pump back strokes, and hence the periods required for them, are minimized.

Using the modulator piston 28 intermediate position, which can be inspected by the position indicator 68, the brake pressure setting device 10 can therefore be prepared for a similarly good response behavior with respect to both drive slip and antilocking operation.

The output signals of the position indicator 68, characteristic of the piston position, can be used in many ways for both drive slip and antilocking operation to suit the requirements of brake pressure change phases. Two representative examples are provided below to indicate the general principle of such possibilities of use.

1. If, in the course of a brake pressure reduction phase of an antilocking control cycle, a slight displacement of the modulator piston 28 in the direction of increasing the modulation chamber 34 has already sufficed to terminate a locking tendency on the rear axle, the electronic control unit 61 assesses the relevant output signal of the position indicator 68. For this purpose, the indicator position is compared with a position signal characteristic of the initial position of the piston 28 as, for example, indicating that the changes in the friction coefficients between the track and the braked vehicle wheel initiating the response of the antilocking control system were obviously only relatively slight and that, in consequence, in a subsequent brake pressure restoration phase, the brake pressure can be "immediately" (i.e. without insertion of a brake pressure retention phase), increased again to the value previously selected by the brake unit.

2. If (when in antilocking or in drive slip control operation) a reduction in the locking or spinning tendency only appears after the modulator piston 28 has executed a relatively large stroke in the direction of producing a brake pressure reduction or brake pressure buildup in the wheel brake subject to the control system (recognizable from the position indicator output signal), the electronic control unit 61 assesses this in indicating that the vehicle is moving in a region of the track subject to low friction coefficients between the vehicle wheels and the track. As a consequence thereof, brake pressure restoration or brake pressure reduction phases have to be controlled "carefully." To that end it is desirable to interrupt these reduction phases by brake pressure retention phases.

It is obvious that it is not possible to deal with all the possible control algorithms which are favorable for sensitive antilocking and drive slip control by using the information on the position of the modulator piston 28 and its changes obtainable from the position indicator 68. Such control algorithms could be taken into consideration in the case of obvious utilization of the position indicator output signals and the output signals of the wheel rotational speed sensors and, if appropriate, output signals of other sensors or signal generators which generate output signals characteristic of the functional condition of the power unit of the vehicle, could be used. That is, these could be output signals from a throttle position indicator, or a control linkage position indicator. However, the possibilities existing in principle have been sufficiently demonstrated by the examples explained above and have to this extent been indicated. It is therefore possible to dispense with the description of further obvious control cycle variants.

A number of important test functions concerning the functional readiness of the brake pressure setting device 10 and the antilocking and drive slip control equipment can be controlled by the output signals which are characteristic of the position of the modulator piston 28 as sensed by the position indicator 68. These test functions could be carried out during a test cycle which is initiated automatically when the ignition is switched on, or at a time selected by the driver, through operation of a test switch specially provided for that purpose. Examples of these are:

1. Response and switch over time of the functional control valve 46.

2. Response and switch over times of the pressure inlet control valve 37 and the brake pressure control valves 56 and 57.

3. Ease of movement of the modulator piston 28.

4. Leak tightness of the pressure inlet control valve 37 and the brake pressure control valves 56 and 57.

Possibilities for use in carrying out such test cycles are thoroughly described in German Patent Application No. P 3,723,875.2-21 mentioned at the beginning and reference and incorporation of the contents of that application is hereby made.

In a particular configuration of the brake pressure control device 10, its pressure modulator 21 is equipped with an electronic force sensor 73, shown "underneath" the central longitudinal axis 24. This sensor generates an electrical output signal whose level is a measure of brake pressure present in the modulation chamber 34.

In this arrangement, the modulator piston 28' is formed in two parts, an annular flange shaped larger piston step 42', which forms the movable boundary of the control pressure space 44, and the piston flange 32', which forms the movable boundary of the modulation chamber 34'. The piston part 42' forming the larger piston step is provided with a short sleeve shaped guide seating 74 at its end facing towards the smaller piston step 32'. A similarly short, circular cylindrical guide extension 76 of the smaller piston flange 32 forming the boundary of the modulation chamber 34 protrudes in the axial direction into the guide seating 74. The two piston parts 42' and 32' are slightly displaceable relative to one another in the axial direction. The electronic sensor element 81, generates an electrical output signal as the measure of the axial force, represented by the arrow 82. The smaller piston part 32' can be pressed against the larger piston part 42' of the modulator piston 28'. Here the pressure signals are located within a circular disc shaped space 79, bounded by the end surface 77 of the cylindrical guide extension 76 of the smaller piston step 32' and the central region 78 of the inner end surface of the piston part forming the larger piston step 42' and its cylindrical sleeve shaped guide extension 74. The sensor element 81 of the force sensor 73, whose output signal is therefore a measure of the pressure present in the modulation chamber 34, is represented by a circular disc shaped element which is clamped between the two piston parts 42' and 32' and is elastically compressible to a greater or lesser extent, or can be deformed in the axial direction, depending on the magnitude of the effective force within the circular disc shaped space 79. It is assumed that the output signal of this force sensor 73 is respectively proportional to the axial compression or deformation of its sensor element 81.

Such a sensor element 81 can be piezo-electric crystal, e.g. a quartz plate, or a deformation sensitive resistance material, possibly with the help of strain gauges which, for example, are arranged on a peripherally supported plate and are bent under the influence of the axial forces acting on the piston flanges 32' and 42'. Such sensors generate the output signal proportional to force or pressure within a favorably small deformation stroke and can therefore be effected with favorably small spatial dimensions so that they do not make any noticeable contribution to the installation size of the pressure modulator 21 or of its piston 28'.

The output signal of the force sensor 73, 81, provides a direct measure of the pressure in the modulation chamber 34 of the pressure modulator 21 and can be used in combination with the output signals of the wheel rotational speed sensors 62 and 63 for controlling pressure change phases of both the antilocking control system and the drive slip control system, particularly for controlling pressure addition in the pressure buildup phases of both types of control.

The brake pressure setting device 10 can be bypassed by a bypass flow bath, 83, which, in case the pressure inlet control valve 37 should remain "struck" in its shut off "I" position due to a faulty function, brake pressure previously build up on the rear wheel brakes 11 and 12, can be again reduced. For this purpose, the two wheel brakes 11 and 12 are each connected via outlet non-return valves 84 and 86 to a bypass pipe 87 feeding back directly to the pressure outlet 38 of the tandem main cylinder associated with the rear axle brake circuit II. This bypass pipe 87 can be shut off, or opened, by an outlet control valve 88 controlled by the electronic control unit 61. This outlet control valve 88 is designed as a 2/2-way solenoid valve with a basic "0" through flow position and an actuated "I" shut off position. This outlet control valve 88 is controlled jointly with the pressure inlet control valve 37 in its actuated "I" position and is switched back jointly with the pressure inlet control valve 37 into its basic "0" position.

The two outlet non-return valves 84 and 86 have a closing force equivalent to a pressure of a 2–4 bar and are each subjected in the opening direction to a pressure in the wheel brakes 11 and 12 which is higher than that in the bypass pipe 87.

Although the present invention has been described and illustrated in detail, it is to be clearly understood that the same is by way of illustration and example only, and is not to be taken by way of limitation. The spirit and scope of the preSent invention are to be limited only by the terms of the appended claims.

What is claimed:

1. Brake pressure setting system for vehicle brakes for stabilizing dynamic behavior of a road vehicle by its brake installation including a control for brake pressure build-up, brake pressure retention and brake pressure reduction phases wherein said vehicle has at least two driven wheels and a wheel brake for each of said driven wheels;

the wheel brakes of the two driven vehicle wheels being combined in a static brake circuit;

a pressure modulator means with an electrically drivable inlet control valve means connecting said pressure modulator means to an outlet pressure space of a brake unit when said inlet valve means is in a basic position and disconnecting said pressure modulator means when said valve means is in a shut off position;

said pressure modulator means being designed as a stepped cylinder with two bore steps of different diameters and with a stepped piston means in said bore steps;

said stepped piston having two flanges with diameters that correspond to the different diameters of the bore steps;

said stepped piston means being displaceable in said bore steps in a pressure tight manner;

said flanges each forming axially movable boundaries of a modulation chamber and a control pressure space, respectively;

said modulation chamber being bounded by the smaller diameter piston step of said two different diameter steps and connected via the pressure inlet control valve means when in a basic position to the outlet pressure space of the brake unit as well as being permanently connected to a section of a main brake pipe of the static brake circuit which branches off to the wheel brakes;

said pressure modulator means being provided with a return spring which urges the modulator piston means into a basic position associated with a maximum volume of the modulation chamber;

said control pressure space being bounded by the larger diameter piston step of said two different diameter piston steps and alternatively connected by an electrically drivable function control valve means to a high pressure outlet of an auxiliary pressure space when the function control valve is in a basic position, or to a non-pressurized container of said auxiliary pressure source when the function valve is in another position;

wherein said stepped piston is displaceable by connection of the high pressure into said control pressure space and against the force of said return spring and pressure present in the modulation chamber, into an end position corresponding to a minimum volume of the modulation chamber and to a maximum volume of the modulation chamber;

two electrically controllable brake pressure control valves means, each individually associated with one of the wheel brakes;

wherein said pressure control valve means are driven at least one of individually and jointly from a basic position opening a connection between the particular wheel brake and the main brake pipe allowing for brake pressure build-up and pressure reduction phases of said wheel brake(s), into an alternative shut off position for closing said connection so as to maintain brake pressure at said wheel brake(s);

an electronic control unit means which generates output signals for triggering the brake pressure control valves means, the function control valve means and the inlet control valve means in response to output signals from wheel rotational speed sensors, characteristic of motion behavior of the vehicle wheels;

wherein, when a spin tendency appears at least at one of the driven vehicle wheels, the electronic control unit means generates output signals to cause the brake pressure control valves means of the at least one driven vehicle wheel to move to a shut off position to maintain brake pressure at the wheel brakes, and to move the function control valve means into a position causing pressure relief of the control pressure space of the pressure modulator by said connection to a non-pressurized container, when at least one of lower limiting values $\lambda_{A1}$ and $b_{A1}$ of at least one of the drive slip $\lambda_A$ and the wheel peripheral acceleration $b_A$ are exceeded, these lower limiting values being lower than threshold values $\lambda_{A2}$ and $b_{A2}$ beyond which the use of a drive slip control system becomes necessary;

wherein when at least one of a higher response threshold value(s) $\lambda_{A2}$ and $b_{A2}$ are reached, the electronic control unit means generates a first output signal for switching the pressure inlet control valve means into a shut off position disconnecting the modulation chamber from the output pressure space; and a second output signal which switches back the at least one of the two brake pressure control valves means associated with a wheel with the tendency to spin, into its basic position and a third output signal which switches the function control valve means into its basic position causing the control pressure space to be connected to the pressure outlet of the auxiliary pressure source; and wherein after the spin tendency has decayed, the electronic control unit means generates that combination of output signals which switches back all the valves means to their basic positions.

2. Brake pressure setting device according to claim 1, wherein when a spin tendency decays, the electronic control means first generates an output signal to move said function control valve means to its other position wherein the control pressure space of the pressure modulator means is again relieved to the non-pressurized container of the auxiliary pressure source and only then generates the output signal by which the inlet control valve means is driven back into its basic position connecting the modulation chamber to the outlet pressure space.

3. Brake pressure setting device according to claim 1, wherein the electronic control unit means generates a signal causing the switching of the function control valve means into its basic position connecting the control pressure space of the pressure modulator to the high pressure outlet of the auxiliary pressure source immediately after the pressure inlet control valve means is switched into its shut off position.

4. Brake pressure setting device according to claim 2, wherein the electronic control unit means generates a signal causing the switching of the function control valve means into its basic position connecting the control pressure space of the pressure modulator to the high pressure outlet of the auxiliary pressure source immediately after the pressure inlet control valve means is switched into its shut off position.

5. Brake pressure setting device according to claim 1, wherein the pressure modulator is provided with a position indicator means which generates a signal for the electronic control means characteristic of the position of the modulator piston.

6. Brake pressure setting device according to claim 2, wherein the pressure modulator is provided with a position indicator means which generates a signal for the electronic control means characteristic of the position of the modulator piston.

7. Brake pressure setting device according to claim 3, wherein the pressure modulator is provided with a position indicator means which generates a signal for the electronic control means characteristic of the position of the modulator piston.

8. Brake pressure setting device according to claim 4, wherein the pressure modulator is provided with a position indicator means which generates a signal for the electronic control means characteristic of the position of the modulator piston.

9. Brake pressure setting device according to claim 1, wherein the modulator piston is provided with a force sensor which generates a signal for the electronic control means characteristic of the pressure in the modulator chamber.

10. Brake pressure setting device according to claim 2, wherein the modulator piston is provided with a force sensor which generates a signal for the electronic control means characteristic of the pressure in the modulator chamber.

11. Brake pressure setting device according to claim 3, wherein the modulator piston is provided with a force sensor which generates a signal for the electronic control means characteristic of the pressure in the modulator chamber.

12. Brake pressure setting device according to claim 4, wherein the modulator piston is provided with a force sensor which generates a signal for the electronic control means characteristic of the pressure in the modulator chamber.

13. Brake pressure setting device according to claim 5, wherein the modulator piston is provided with a force sensor which generates a signal for the electronic control means characteristic of the pressure in the modulator chamber.

14. Brake pressure setting device according to claim 6, wherein the modulator piston is provided with a force sensor which generates a signal for the electronic control means characteristic of the pressure in the modulator chamber.

15. Brake pressure setting device according to claim 7, wherein the modulator piston is provided with a force sensor which generates a signal for the electronic control means characteristic of the pressure in the modulator chamber.

16. Brake pressure setting device according to claim 8, wherein the modulator piston is provided with a force sensor which generates a signal for the electronic control means characteristic of the pressure in the modulator chamber.

17. Brake pressure setting device according to claim 1, wherein a bypass flow path is provided between the outlet pressure space and the two wheel brakes and which includes a bypass pipe directly connected to the outlet pressure space, of the brake unit and which is shut off by an outlet control valve means;
 said bypass pipe being connected to each of the vehicle wheel brakes of the driven vehicle wheels by two outlet non-return valve means, respectively; and
 wherein the outlet control valve means is designed as a solenoid valve which is driven by the electronic control means into flowthrough and shut off positions cojointly with the inlet valve means.

18. Brake pressure setting device according to claim 2, wherein a bypass flow path is provided between the outlet pressure space and the two wheel brakes and which includes a bypass pipe directly connected to the outlet pressure space, of the brake unit and which is shut off by an outlet control valve means;
 said bypass pipe being connected to each of the vehicle wheel brakes of the driven vehicle wheels by two outlet non-return valve means, respectively; and
 wherein the outlet control valve means is designed as a solenoid valve which is driven by the electronic control means into flowthrough and shut off positions cojointly with the inlet valve means.

19. Brake pressure setting device according to claim 3, wherein a bypass flow path is provided between the outlet pressure space and the two wheel brakes and which includes a bypass pipe directly connected to the outlet pressure space, of the brake unit and which is shut off by an outlet control valve means;
 said bypass pipe being connected to each of the vehicle wheel brakes of the driven vehicle wheels by two outlet non-return valve means, respectively; and
 wherein the outlet control valve means is designed as a solenoid valve which is driven by the electronic control means into flowthrough and shut off positions cojointly with the inlet valve means.

20. Brake pressure setting device according to claim 4, wherein a bypass flow path is provided between the outlet pressure space and the two wheel brakes and which includes a bypass pipe directly connected to the outlet pressure space, of the brake unit and which is shut off by an outlet control valve means;
 said bypass pipe being connected to each of the vehicle wheel brakes of the driven vehicle wheels by two outlet non-return valve means, respectively; and
 wherein the outlet control valve means is designed as a solenoid valve which is driven by the electronic control means into flowthrough and shut off positions cojointly with the inlet valve means.

* * * * *